US009755204B2

(12) United States Patent
Shimura et al.

(10) Patent No.: US 9,755,204 B2
(45) Date of Patent: Sep. 5, 2017

(54) SEPARATOR, ELECTRODE ELEMENT, ELECTRIC ENERGY STORAGE DEVICE AND METHOD FOR PRODUCING SEPARATOR (71) Applicant: NEC Corporation, Tokyo (JP)

(72) Inventors: Kenichi Shimura, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/650,402

(22) PCT Filed: Nov. 12, 2013

(86) PCT No.: PCT/JP2013/080596
§ 371 (c)(1),
(2) Date: Jun. 8, 2015

(87) PCT Pub. No.: WO2014/091857
PCT Pub. Date: Jun. 19, 2014

(65) Prior Publication Data
US 2015/0340679 A1    Nov. 26, 2015

(30) Foreign Application Priority Data
Dec. 12, 2012  (JP) ................................ 2012-271288

(51) Int. Cl.
*H01M 2/16*    (2006.01)
*H01M 2/14*    (2006.01)
*H01M 10/0525*  (2010.01)
*H01G 11/52*   (2013.01)
*H01M 10/052*  (2010.01)

(52) U.S. Cl.
CPC ............ *H01M 2/145* (2013.01); *H01G 11/52* (2013.01); *H01M 2/1613* (2013.01);
(Continued)

(58) Field of Classification Search
CPC .................... H01M 2/1646; H01M 2/1686
See application file for complete search history.

(56) References Cited

U.S. PATENT DOCUMENTS

2003/0054232 A1*   3/2003   Zucker ............... H01M 2/1666
                                                     429/144
2003/0054233 A1*   3/2003   Zucker ............... H01M 2/1666
                                                     429/144
(Continued)

FOREIGN PATENT DOCUMENTS

DE           19838800 C1    3/2000
EP            2235767 B1    3/2011
(Continued)

OTHER PUBLICATIONS

International Search Report corresponding to PCT/JP2013/080596 mailed Jan. 14, 2014 (2 pages).
(Continued)

*Primary Examiner* — Olatunji Godo
(74) *Attorney, Agent, or Firm* — Wilmer Cutler Pickering Hale and Dorr LLP (57) ABSTRACT The present invention provides a separator drastically reducing the short-circuit between electrodes and having satisfactory ionic conductivity on the basis of the use of inorganic materials. The separator 23 has a substrate 23a including a layer formed by using an inorganic material so as to have a plurality of openings, and an inorganic fiber layer 23b laminated on one surface or both surfaces of the substrate 23a so as to cover the openings of the substrate 23a without blocking the openings of the substrate 23a. The thickness of the separator 23 is 100 μm or less.

14 Claims, 3 Drawing Sheets (52) U.S. Cl.
CPC ....... *H01M 2/1673* (2013.01); *H01M 2/1686* (2013.01); *H01M 10/0525* (2013.01); *H01M 10/052* (2013.01); *Y02E 60/13* (2013.01); *Y10T 156/10* (2015.01)

(56) References Cited

U.S. PATENT DOCUMENTS

| | | | |
|---|---|---|---|
| 2005/0031942 A1* | 2/2005 | Hennige | H01M 2/1613 429/144 |
| 2009/0148760 A1 | 6/2009 | Justice | |
| 2010/0099021 A1* | 4/2010 | Oikawa | H01M 2/18 429/129 |

FOREIGN PATENT DOCUMENTS

| | | |
|---|---|---|
| EP | 2235767 B1 | 8/2011 |
| JP | S58-212056 A | 12/1983 |
| JP | S63-284755 A | 11/1988 |
| JP | H01-307156 A | 12/1989 |
| JP | H04-82155 A | 3/1992 |
| JP | H10-12211 A | 1/1998 |
| JP | 2004-269579 A | 9/2004 |
| JP | 2005-502177 A | 1/2005 |
| JP | 2005-503652 A | 2/2005 |
| JP | 2005-347032 A | 12/2005 |
| JP | 2007-317405 A | 12/2007 |
| JP | 2011-507191 A | 3/2011 |
| JP | 4831937 B2 | 12/2011 |
| WO | WO-2009/076401 A1 | 6/2009 |

OTHER PUBLICATIONS

Chinese Office Action issued by the State Intellectual Property Office of the People's Republic of China for Application No. 201380065140.0 dated Jul. 29, 2016 (19 pages).

* cited by examiner

SEPARATOR, ELECTRODE ELEMENT, ELECTRIC ENERGY STORAGE DEVICE AND METHOD FOR PRODUCING SEPARATOR

CROSS-REFERENCE TO RELATED APPLICATIONS

This application is a national stage application of International Application No. PCT/JP2013/080596 entitled "Separator, Electrode Element, Electric Energy Storage Device, and Method for Producing Separator," filed on Nov. 12, 2013, which claims the benefit of the priority of Japanese Patent Application No. 2012-271288, filed on Dec. 12, 2012, the disclosures of each of which are hereby incorporated by reference in their entirety.

TECHNICAL FIELD

The present invention relates to a separator having a substrate containing an inorganic material, and an electrode element and an electric energy storage device using the separator. The present invention also relates to a method for producing the separator.

BACKGROUND ART

With the rapid expansion of the markets for notebook personal computers, cellular phones, electric vehicles and the like, electric energy storage devices such as capacitors and secondary batteries are actively investigated. Among others, lithium ion secondary batteries are attractive because of being capable of storing larger amounts of energies. Currently, batteries having further higher energy densities are demanded, and as candidates meeting such demands, the use of metals such as tin and silicon, or the alloys and the oxides of these as negative electrode active materials is proposed. However, batteries having the higher energy densities are the larger in the releasable energies, and hence require the more thoughtful considerations about the safety.

For example, in electric energy storage devices such as lithium ion secondary batteries, separators prevent the short-circuit between the positive electrode plate and the negative electrode plate, and play a role of effectively migrating the lithium ions. Polyolefin-based microporous separators made of polypropylene materials or polyethylene materials have hitherto been mainly used. This is because the shut-down effect possessed by these materials contributes to the safety at the time of heat generation of batteries. However, the use of a polyethylene material for a high energy density battery results in the melting of the separator before the shut-down effect is obtained, and leads to a possibility of the occurrence of short-circuit between electrodes over wide areas.

It has been investigated to use, as a separator substrate high in heat resistance and high in strength, a substrate made of an inorganic material, in particular a substrate made of a woven fabric, and more particularly a glass cloth. Glass cloth is high in strength, and the melting point of nonalkali glass (E-glass) for materials for electronic boards is as high as 800° C. or higher. Glass cloth has no shut-down effect possessed by polyolefin-based microporous separators, but is predominantly higher in melting point as compared with organic polymers, and hence is sometimes rather excellent in safety.

Glass cloth is a product obtained by weaving yarns prepared by bundling glass fibers, and hence cutting processing of glass cloth sometimes causes texture collapse starting from the cut portion to be frayed, or glass cloth is sometimes deformed in the assembly steps of electric energy storage devices. When glass cloth is subjected to a force perpendicular to surface of the glass cloth, the texture is expanded to result in a possibility that the positive electrode plate and the negative electrode plate are short-circuited to each other. Accordingly, in order to reinforce glass cloth, a composite material composed of glass cloth and an organic polymer material, in particular a thermoplastic polymer material has been investigated.

Patent Document 1 (JP H10-12211 A) discloses a composite film for battery separators prepared by laminating a woven or non-woven fabric made of glass fibers having specific physical properties on a polyolefin microporous film made of a polyolefin having a specific high molecular weight. The lamination treatment is performed by a conventional calendering treatment.

Patent Document 2 (JP 4831937) describes a separator in which glass cloth is used as a substrate, and a layer made of an organic polymer is integrated as a binder with the front and back sides of the substrate. As the organic polymer, for example, polyvinylidene fluoride, polyvinylidene fluoride copolymer or polyvinylidene fluoride is quoted as an example. In this way, the reinforcement and the overcharging prevention function are imparted.

Patent Document 3 (JP 2004-269579 A) discloses, as a microporous film suitable as a separator for a lithium battery, a glass fiber fabric-reinforced polyolefin microporous film obtained by a process in which a film layer formed from a composition composed of a polyolefin and a solvent is superposed on and pressed to a glass fiber fabric, so as for the glass fiber fabric to be impregnated with the composition, and subsequently the impregnated glass fiber fabric is cooled and then the solvent is removed from the fabric concerned to produce an intended microporous film.

Also for lead storage batteries, separators including glass fiber fabric have also been investigated from the viewpoint of the mechanical strength. In the separators for lead storage batteries, glass fiber fabric is used as the supporting material to support the fibrous layer absorbing and immobilizing the electrolytic substance (electrolyte). As a separator for closed type lead storage batteries, Patent Document 4 JP 2005-503652 A) discloses glass fiber as the fibrous layer absorbing and immobilizing the electrolytic substance (electrolyte), and also discloses glass fiber fabric as the supporting layer of the fibrous layer.

PRIOR ART REFERENCES

Patent Documents

Patent Document 1: JP H10-12211 A
Patent Document 2: JP 4831937
Patent Document 3: JP 2004-269579 A
Patent Document 4: JP 2005-503652 A

SUMMARY OF INVENTION

Technical Problem

In a polyolefin-based microporous separator, a polypropylene or polyethylene material itself has no ionic conductivity, and hence the sizes of the voids and holes of the separator are required to be made larger in order to increase the lithium ion conductivity. The melting point of the polypropylene or polyethylene material is 180° C. or lower, and it has been pointed out that thermal contraction occurs at the time of high temperature, and short-circuit possibly occurs.

As described in Patent Document 1 to Patent Document 3, a composite material produced by combining an organic polymer film and woven fabric of an inorganic material such as glass allows the shape of the whole of a separator to be maintained by the inorganic material, and hence the resistance to the thermal contraction is increased. The yarns of the woven fabric of the inorganic material are fixed to the organic polymer film, and hence fraying from the cut portion is not caused.

However, a composite film composed of an organic polymer film and a woven fabric of an inorganic material such as glass is hardly controllable with respect to the ionic conductivity. In general, a woven fabric of an inorganic material is large in the size of the openings, accordingly the short-circuit between the electrodes occurs through openings when abnormal protrusions are present on the electrode surface, or an external force deforms the electrodes, and hence the organic polymer film is combined in order to prevent the short-circuit. However, even when an organic polymer film having swelling property to the electrolyte is used, the ionic conductivity of the electrolyte is less than 1 mS/cm, and the increase of the internal resistance of the battery is caused. Alternatively, when the battery is exposed to a high temperature, for example, by accident, the organic polymer film is contracted, and accordingly cannot cover the openings of the woven fabric of an inorganic material, and consequently the short-circuit between the electrodes is possibly caused.

On the other hand, the separator, described in Patent Document 4, for closed type storage batteries, in which the fibrous layer and the supporting layer thereof are constituted with glass fiber, does not include an organic polymer film and accordingly can be expected to have high heat resistance. However, the fibrous layer has a function to absorb and retain electrolyte, and accordingly is required to have a thickness of 200 μm or more. Therefore, the positive electrode and the negative electrode are widely separated from each other, and the internal resistance of the battery comes to be large. A battery using a thick separator is low in the chargeable energy density per unit volume and unit weight.

An object of the present invention is to provide a separator excellent in various important performances for batteries such as the reduction of short-circuit between electrodes and satisfactory ionic conductivity on the basis of the use of inorganic materials so as to be free from the occurrence of thermal contraction at the time of high temperatures, and to provide an electrode element and an electric energy storage device. Another object of the present invention is to provide a method for producing such a separator as described above.

Solution to Problem

The present inventors made a diligent study in order to achieve the above-described objects, and consequently have discovered that at least by laminating a layer formed by using an inorganic material and a layer constituted with inorganic fibers, a separator having satisfactory ionic conductivity is obtained while the short-circuit between electrodes is being prevented.

In order to achieve the above-described objects, the separator of the present invention is a separator for an electrode element having a positive electrode and a negative electrode disposed so as to face each other, the separator having a substrate including at least a layer formed by using an inorganic material so as to have a plurality of openings, and an inorganic fiber layer laminated on one surface or both surfaces of the substrate in such a way that the inorganic fiber layer covers the openings without blocking the openings, wherein the thickness of the whole separator is 100 μm or less. As the layer formed of an inorganic material, a woven fabric or a knitted fabric made of inorganic fiber, in particular glass cloth is preferably used, and the inorganic fiber layer preferably contains glass fibers.

The electrode element of the present invention has the separator of the present invention, and a positive electrode and a negative electrode disposed so as to face each other with the separator interposed therebetween.

The electric energy storage device of the present invention has the electrode element of the present invention, an electrolyte and an outer package including the electrode element and the electrolyte.

The present invention further provides a method for producing the separator. The method for producing a separator of the present invention is a method for producing a separator for an electrode element having a positive electrode and a negative electrode disposed so as to face each other, the production method including: preparing a substrate including at least a layer formed by using an inorganic material so as to have a plurality of openings; and laminating an inorganic fiber layer on one surface or both surfaces of the substrate, wherein the thickness of the substrate and the thickness of the inorganic fiber layer are selected so as for the thickness of the whole separator to be 100 μm or less.

Advantageous Effects of Invention

According to the present invention, it is possible to provide a separator, an electrode element and an electric energy storage device excellent in various performances in such a way that ionic conductivity is satisfactory, and the occurrence of the short-circuit between the electrodes in the electrode element and the electric energy storage device is extremely reduced. In the production process, the yield is improved and the handling is easy, and thus the productivity of the electrode element and the electric energy storage device can be improved.

DESCRIPTION OF EMBODIMENTS

An embodiment of the present invention relates to a separator for an electrode element having a positive electrode and a negative electrode disposed so as to face each other, the separator including a substrate including at least a layer formed by using an inorganic material so as to have a plurality of openings, and an inorganic fiber layer laminated on one surface or both surfaces of the substrate so as to cover the openings without blocking the openings, wherein the thickness of the whole separator is 100 μm or less. Another embodiment of the present invention relates to an electrode element and an electric energy storage device having the separator. Yet another embodiment of the present invention relates to a method for producing a separator for an electrode element having a positive electrode and a negative electrode disposed so as to face each other, the production method including: preparing a substrate including at least a layer formed by using an inorganic material so as to have a plurality of openings; and laminating an inorganic fiber layer on one surface or both surfaces of the substrate, wherein the thickness of the substrate and the thickness of the inorganic fiber layer are selected so as for the thickness of the whole separator to be 100 µm or less.

Hereinafter, the above-described individual constituent members and constituent materials are described.

<Separator>

The separator has a substrate including at least a layer formed by using an inorganic material. The separator is present between the positive electrode and the negative electrode along with the electrolyte and is constituted so as to have ionic conductivity while preventing the short-circuit between the positive electrode and the negative electrode. The layer formed of an inorganic material, included in the substrate, has no electrical conductivity, but the separator itself has ionic conductivity. The separator is preferably hardly affected by the electrolyte. The strength and the shape retainability required for the separator are provided by the substrate. Accordingly, the layer included in the substrate may contain any inorganic materials that allow the separator to be constituted in such a way that the separator has ionic conductivity, is hardly affected by the electrolyte and has necessary strength and necessary shape retainability. The inclusion, in the substrate, of at least a layer formed of an inorganic material enables to obtain a separator that ensures the mechanical strength required for the separator, and at the same time, is almost free from thermal contraction at the time of heating, and is excellent in dimensional stability under varying temperature.

The layer included in the substrate has a plurality of openings. The opening as referred to herein allows the front surface side and the back surface side of the layer to communicate with each other, and may have an optional path from the front surface to the back surface of the layer. The individual openings may be independent from each other, or alternatively two or more openings may be communicatively connected with each other in the layer.

Examples of the inorganic material used for the substrate include ceramic and glass. Examples of the form of the inorganic material include inorganic fiber and inorganic porous film. The inorganic fiber can form a layer included in the substrate by taking a form of a woven fabric, a knitted fabric or a non-woven fabric. In this case, a plurality of openings are formed by the voids between the inorganic fibers. The inorganic porous film can be formed as a layer included in the substrate by, for example, mechanically forming a plurality of holes by, for example, punching of a sheet formed of an inorganic material, by using a coarse sintered body of ceramic particles (with the grain boundaries not completely filled), or by forming a film-like shape with inorganic particles by using a binder. Among these various forms of inorganic materials, alumina fiber or glass fiber can be preferably used, and glass fiber is particularly preferable. This is because glass fibers are industrially widely diffused in the applications to electronic materials including printed wiring boards, and in the applications to FRP resins used for boats and ships, and thus are easily available materials. Examples of the glass fibers include microfiber wool, glass wool and glass fiber.

When the layer included in the substrate is constituted with inorganic fibers, the inorganic fibers may be either long fibers or short fibers. When the inorganic fibers are long fibers, a substrate can be produced by using a woven fabric or a knitted fabric made of the inorganic fibers obtained by weaving or knitting the inorganic fibers as they are. When the inorganic fibers are short fibers, the short fibers are twisted into yarns, and a substrate can be produced by using a woven fabric or a knitted fabric obtained by weaving or knitting the resulting yarns.

The form of the inorganic fibers is preferably a woven fabric. This is because such a woven fabric allows a separator having a thickness as thin as 50 µm or less to be easily obtained. A woven fabric allows the amount used of a binder to be made small when the substrate further contains a binder as described below. The thickness of the separator affects the weight density or the volume density of the battery energy, and hence is preferably as thin as possible. Examples of weave include: plain weave, twill, satin, leno cloth, mock leno, broken twill and double cloth; among these, plain weave is particularly preferable from the viewpoint that thin and light separators are obtained. Fabric having smaller and denser texture is more excellent in insulating function, and hence, from this viewpoint, plain weave, twill and satin are preferable. From the same reasons, thinner inorganic fibers are better, and thus the fiber diameter is preferably 20 µm or less, more preferably 10 µm or less and furthermore preferably 5 µm or less. On the other hand, from the viewpoint of the strength of inorganic fiber and the easiness in producing inorganic fiber, the fiber diameter is preferably 1 µm or more. It is difficult to produce inorganic fibers having a fiber diameter of less than 1 µm, and such inorganic fibers eventually may cause high cost in the production of substrates.

A substrate may contain a binder for the purpose of reinforcing inorganic fibers. The addition of a binder allows the texture of inorganic fibers to be hardly loosened and increases the self-supporting capability of inorganic fibers, and hence improves the productivity in assembling batteries. The binder may be either an inorganic binder made of an inorganic material or an organic binder containing an organic material.

Examples of the inorganic binder include, without being particularly limited to: silica-based materials, alumina-based materials, silica alumina-based materials and aluminum phosphate-based materials. Examples of the suitably usable organic binder include: polyvinylidene fluoride (PVdF), polyethylene oxide (PEO), polyacrylonitrile (PAN), polymethyl methacrylate (PMMA) and copolymers of these polymers. These binders may be used each as a single material, or as mixtures of two or more materials. Polyvinyl alcohol (PVA), a water-soluble resin, can also be used as a binder.

On one surface or both surfaces of the substrate, an inorganic fiber layer containing inorganic fibers is laminated. In other words, the inorganic fiber layer is present in the surface layer(s) of the separator. The inorganic fiber layer covers the openings of the substrate without blocking the openings of the substrate. When the substrate has a woven fabric made of inorganic fibers, the mesh openings (the voids between the fibers formed by the texture) of the woven fabric are the openings of the substrate.

As described above, the substrate includes a layer having a plurality of openings. The openings are the structures required for the purpose of allowing the separator to have ionic conductivity. However, the layer concerned is constituted so as to contain an inorganic material from the viewpoint of ensuring the mechanical strength required for the separator and the dimensional stability under varying thermal conditions; for example, used is a layer prepared by mechanically punching a woven fabric made of inorganic fibers or a sheet formed of an inorganic material. Consequently, in the actual production, the sizes of the openings are frequently too large for being used as a separator. Accordingly, in the case where a separator is constituted with only a substrate, when the separator is incorporated in an electrode element, abnormal protrusions possibly present on the surface of the positive electrode and/or the surface of the negative electrode sometimes pass through the openings to cause the short-circuit between the positive electrode and the negative electrode.

Accordingly, by laminating the inorganic fiber layer on such a substrate, the substrate is covered with the inorganic fiber layer, but the openings of the substrate are not blocked because the inorganic fiber layer has voids between the fibers. Consequently, when the separator is immersed in the electrolyte, ions pass through the openings of the substrate and the voids between the fibers of the inorganic fiber layer and thus can circulate between the front side and the back side of the separator. Moreover, the ion circulation paths include the voids between the fibers due to the inorganic fiber layer, and do not form paths linear over the front side and the back side of the separator. Consequently, the inorganic fiber layer accepts the abnormal protrusions of the positive electrode and/or the negative electrode, and prevents the protrusions from passing through the openings of the substrate.

In other words, the inorganic fiber layer has a function to ensure the ionic conductivity required for the separator while the inorganic fiber layer is accepting the abnormal protrusions of the positive electrode and/or the negative electrode lest that the abnormal protrusions should not pass through the openings of the substrate. Accordingly, in the inorganic fiber layer, the sizes of the pores, specifically the sizes of the voids between the fibers are preferably smaller than the sizes of the openings possessed by the substrate. Thus, the inorganic fiber layer, through being laminated on the substrate, limits the sizes of the openings of the substrate so as to be smaller, and consequently covers the openings of the substrate without blocking the openings concerned. However, even in the case where the sizes of the pores of the inorganic fiber layer are equal to or larger than the sizes of the openings of the substrate, when the structure linearly communicatively connecting the front side and the back side of the separator is absent, for example, due to the location of inorganic fibers over the openings of the substrate, the inorganic fiber layer can accept the protrusions of the positive electrode and/or the negative electrode. The sizes of the openings in the substrate used in the present invention are usually 1 µm or more. Therefore, the sizes of the pores in the inorganic fiber layer is preferably less than 1 µm.

Examples of the inorganic material forming inorganic fibers include ceramic and glass. Among these, silica fiber, alumina fiber or glass fiber can be preferably used, and in particular, glass fiber is preferable. This is because glass fibers are widely diffused, for example, in the applications to electronic materials including printed wiring boards, in the applications to FRP resins used for boats and ships, and in the applications to heat insulating materials and filters, and thus are easily available materials. Examples of the glass fibers include microfiber wool, glass wool and glass fiber.

The inorganic fibers may be used each as a single material, or can be used as mixtures of two or more thereof.

The thickness of the inorganic fiber layer is preferably thick from the viewpoint of enhancing the function to prevent the micro-short circuit, and is specifically preferably 1 µm or more and more preferably 5 µm or more. On the other hand, the thickness of the inorganic fiber layer is advantageously thin from the viewpoint of being capable of enhancing the energy density; from this viewpoint, the thickness of the inorganic fiber layer is preferably 20 µm or less and more preferably 10 µm or less.

The diameter each of the fibers forming the inorganic fiber layer is preferably 10 µm or less and more preferably 5 µm or less, for the purpose of suppressing the thickness of the inorganic fiber layer. The lower limit of the diameter is preferably 0.1 µm or more from the viewpoint of the strength. In the inorganic fiber layer, there may be a distribution of the diameters of the inorganic fibers.

In the inorganic fiber layer, the inorganic fibers can be fixed to each other, and further can be fixed to the substrate by using an inorganic material or an organic polymer material. The following methods are available as the method for fixing the fibers of the inorganic fiber layer to each other and the method for further fixing the fibers of the inorganic fiber layer to the substrate.

(1) A method in which a dispersion prepared by dispersing inorganic fibers in an inorganic or organic binder solution is applied to the surface of the substrate, and the binder is solidified.

(2) A method in which a thermoplastic resin is beforehand attached to the surface of the inorganic fibers, and the thermoplastic resin is heated and melted to allow the inorganic fibers to be heat fused to each other.

(3) A method in which a fibrous or powdery thermoplastic resin is added to the inorganic fiber layer, and the thermoplastic resin is heated and melted to allow the inorganic fibers to be heat fused to each other.

(4) A method in which an adhesive layer made of a thermoplastic resin is formed on the surface of the substrate and an inorganic fiber layer is formed thereover, and then the thermoplastic resin is heated and melted to allow the substrate and the inorganic fiber layer to be heat fused to each other.

(5) A method in which a molten thermoplastic resin is impregnated into the substrate, the inorganic fibers are dispersed on the substrate with the thermoplastic resin in a state of being melted, and then the thermoplastic resin is solidified.

Of the methods (1) to (5), according to the methods (1), (4) and (5), the mutual fixation of the fibers of the inorganic fiber layer and the mutual fixation of the inorganic fiber layer and the substrate can be performed simultaneously. The methods (2) and (3) can perform simultaneously the mutual fixation of the fibers of the inorganic fiber layer and the mutual fixation of the inorganic fiber layer and the substrate when the attachment or the addition of the thermoplastic resin to the inorganic fiber layer is performed on the substrate. In each of the foregoing methods, examples of the thermoplastic resin include polyethylene and polypropylene.

In the method (1), the inorganic fiber layer and the substrate are fixed to each other by using a binder, and the binder used herein may serve as the foregoing binder used for the purpose of reinforcing the substrate or may be different from the binder reinforcing the substrate. In the case where the method (1) is applied, when a substrate reinforced with a binder is used, the binder reinforcing the substrate is different from the binder fixing the inorganic fiber layer and the substrate to each other. However, with respect to the type of the binder, for these binders, the same binder is sometimes used, or alternatively different binders are sometimes used.

On the other hand, when the method (1) is applied by using a substrate not reinforced with a binder, the substrate can also be reinforced with the binder. In such a case, the binder used in the method (1) also serves as the binder reinforcing the substrate. In this method, the reinforcement of the substrate, the mutual fixation of the fibers of the inorganic fiber layer and the mutual fixation of the inorganic fiber layer and the substrate can be performed as a step, and accordingly the production process of the separator can be simplified. The binder is continuous across the boundary between the substrate and the inorganic fiber layer, and hence this method has an advantage that the separator is structurally toughened.

In the mutual fixation of the inorganic fibers and the mutual fixation of the inorganic fiber layer and the substrate on the basis of, for example, the methods (1) to (5), it is important that the binder solution and the thermoplastic resin be not formed as continuous films. Accordingly, the separator is formed by impregnating the binder solution and the thermoplastic resin into the inorganic fiber layer and the substrate without filling the voids between the inorganic fibers and the openings of the substrate.

As described above, heat treatment is frequently performed in the mutual fixation of the fibers of the fiber layer laminated on the substrate, and further in the mutual fixation of the fiber layer and the substrate. The fiber layer laminated on the substrate is an inorganic fiber layer, hence the fibers themselves are not melted by the heat treatment, and accordingly the voids between the fibers for allowing the ions to pass therethrough are maintained and the openings of the substrate are not blocked. On the other hand, when the fiber layer is constituted with an olefin-based resin, the fibers themselves are melted by the heat treatment, and the openings of the substrate are possibly blocked.

The thickness of the separator is not particularly limited; however, the thinner the thickness, the more preferable it is from the viewpoint of being capable of increasing the energy density of the battery. A thin separator can reduce the internal resistance of the battery, to allow energy to be effectively used. On the other hand, a thick separator is preferable from the viewpoint of the strength of the separator and the insulation capability between the electrodes. This is because the strength in the thickness direction is improved, and the occurrence rate of the internal short-circuit can be suppressed. Accordingly, the thickness of the whole separator is set to be 100 μm or less and preferably to be 50 μm or less. By setting the thickness of the whole separator to be 100 μm or less, when an electrode element and an electric energy storage device are produced by using the separator, it is possible to obtain an electrode element and an electric energy storage device low in internal resistance and high in energy density. The lower limit of the thickness of the separator is preferably set to be 5 μm or more and more preferably to be 10 μm or more.

As described above, by setting the thickness of the whole separator to be 100 μm or less, when an electrode element and an electric energy storage device are produced by using the separator, it is possible to obtain an electrode element and an electric energy storage device low in internal resistance and high in energy density. The thickness of the separator is 100 μm or less, and accordingly, in the production of the separator, the thickness of the substrate and the thickness of the inorganic fiber layer are selected so as for the thickness of the whole separator to be 100 μm or more.

The porosity of the separator is desirably set to be 30% or more and 99% or less. This is because by setting the porosity to be 30% or more, the resistance value of the separator is reduced, and the battery performances are improved. In order to enhance this effect, the porosity is desirably 50% or more and more preferably 60% or more. By setting the upper limit of the porosity to be 99%, the occurrence of the internal short-circuit can be suppressed. The porosity can be determined from, for example, the true densities and the total volume of the materials to be the raw materials of the separator, and the weight and the volume of the separator. Moreover, from the viewpoint of suppressing the occurrence of the internal short-circuit, the piercing strength in the thickness direction of the separator is desirably a high value. The piercing strength can be evaluated, for example, on the basis of the load when a metal needle (diameter: 1 to 2 mm, tip r=0.5 mm) is pierced into a separator to be the measurement object at a predetermined speed by using a strength tester such as a texture analyzer.

The value of the ionic conductivity of the separator significantly affects the internal resistance value of the battery, and hence is preferably a large value. For example, when an electrolyte having an ionic conductivity of $10^{-3}$ S/cm is used as the electrolyte of a lithium secondary battery, the ionic conductivity of the separator in a state of being immersed in the electrolyte is desirably $10^{-3}$ to $10^{-6}$ S/cm.

<Constitutions of Electrode Element and Electric Energy Storage Device>

The present invention relates to the electrode element having the above-described separator according to the present invention, and a positive electrode and a negative electrode disposed so as to face each other with the separator interposed therebetween. The present invention also relates to the electric energy storage device having the electrode element, the electrolyte and the outer package including these electrode element and electrolyte.

The electrode element and the electric energy storage device of the present invention can be applied to any various devices that can store electric charge. Examples of the typical device include a lithium ion secondary battery; the electrode element and the electric energy storage device can also be applied to other secondary batteries, and further to capacitors such as electric double-layer capacitors. In the following description, description is made by taking the lithium ion secondary battery as an example, but the present invention is not limited to this, and can be appropriately modified according to the types of the devices to which the present invention is applied, with respect to the shape, constitution and materials.

Examples of the secondary battery include various types, depending on the structure, shape and the like of the electrodes, such as a cylinder type, a flat wound square type, a laminated square type, a coin type, a flat wound laminate type and a composite laminate type. The present invention can be applied to any of these types. Among these, the shape of the secondary battery to which the present invention is applied is preferably the composite laminate type from the viewpoint of the difficulty of breakage of the separator. Hereinafter, a composite laminate type secondary battery is described.

Figure 1:
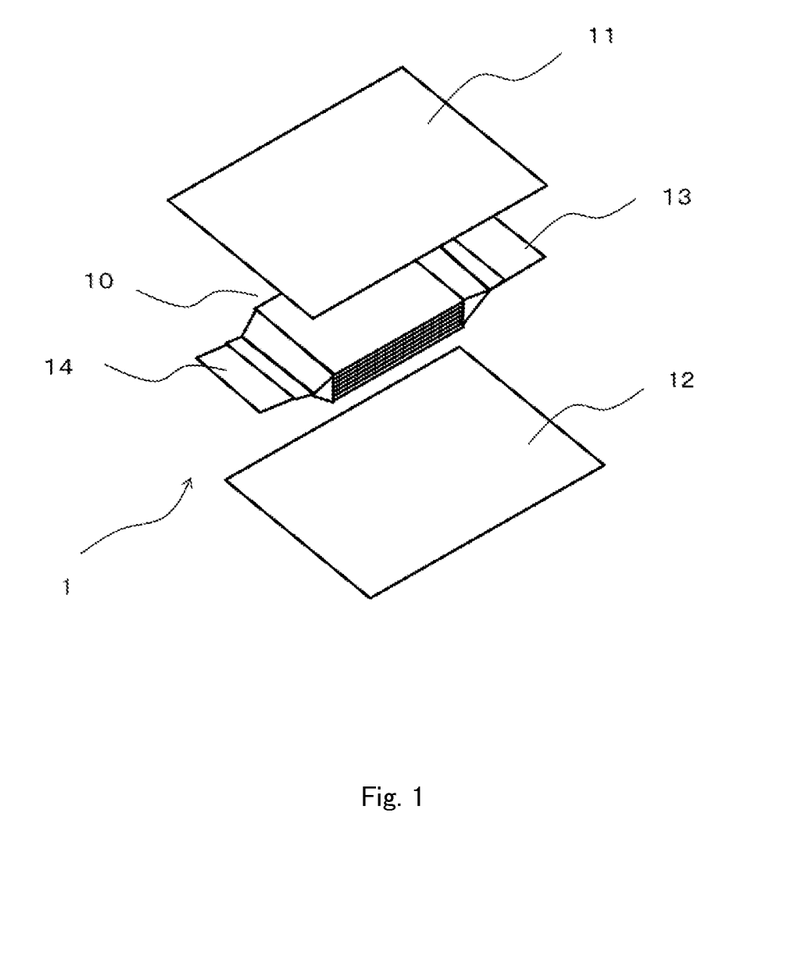
FIG. 1 is an exploded oblique perspective view of a secondary battery, which is an electric energy storage device according to an embodiment of the present invention.

FIG. 1 shows an exploded oblique perspective view of a secondary battery 1, according to an embodiment of the present invention, having an electrode element 10, and an outer package including the electrode element 10 along with the electrolyte by surrounding the electrode element 10 from both sides in the thickness direction thereof with the outer package members 11 and 12. To the electrode element 10, a negative electrode tab 13 and a positive electrode tab 14 are connected so as for a part of each of these tabs to protrude from the outer package.

Figure 2:
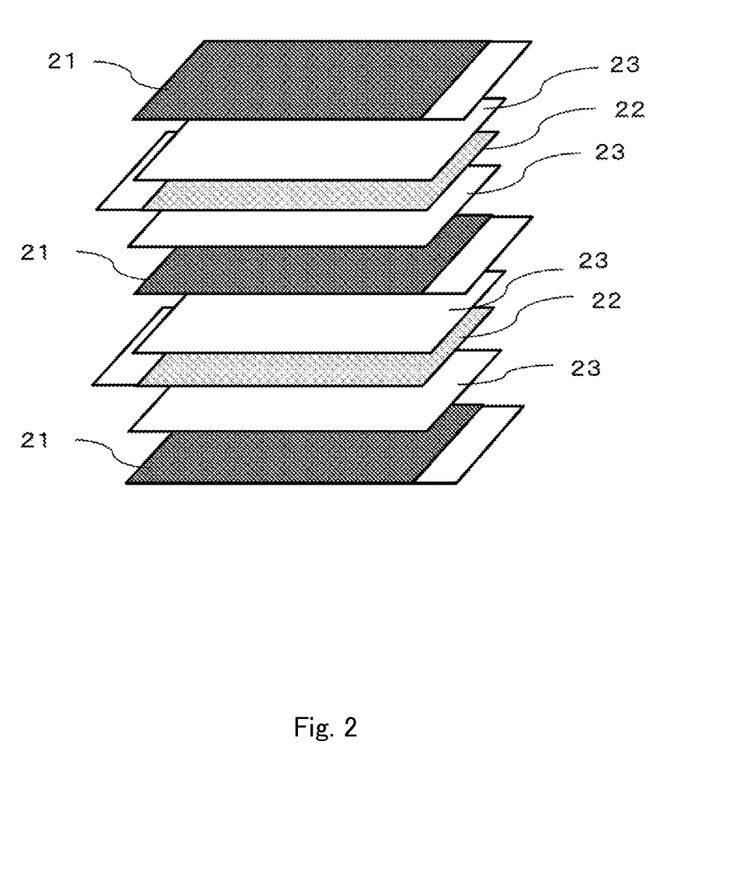
FIG. 2 is a schematic exploded view of the electrode element shown in FIG. 1

As shown in FIG. 2, the electrode element 10 has a structure in which a plurality of negative electrodes 21 and a plurality of positive electrodes 22 are disposed so as to face each other through the intermediary of the separators 23. The negative electrodes 21 and the positive electrodes 22 maintain a mutually insulating state with the separators 23.

Figure 3:
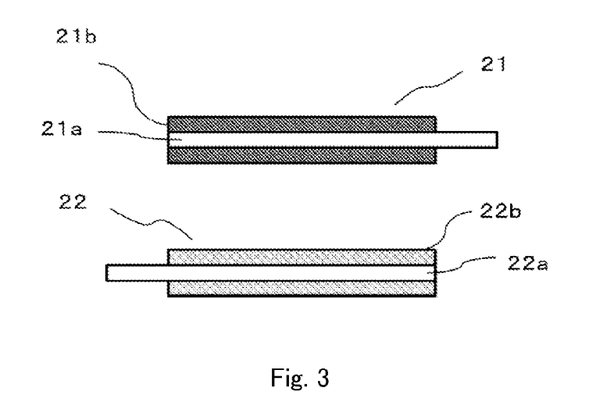
FIG. 3 is a set of schematic cross-sectional views of the positive electrode and the negative electrode shown in FIG. 2.

As shown in FIG. 3, the negative electrode 21 has a negative electrode current collector 21a capable of being formed with a metal foil, and a negative electrode active material 21b formed on both surfaces of the negative electrode current collector 21a. The negative electrode current collector 21a is formed so as to have an extension extended from the area facing the separator 23, and the negative electrode active material 21b is not formed on the extension.

Similarly to the negative electrode 21, the positive electrode 22 also has a positive electrode current collector 22a capable of being formed with a metal foil, and a positive electrode active material 22b formed on both surfaces of the positive electrode current collector 22a. The positive electrode current collector 22a is formed so as to have an extension extending from the area facing the separator 23, and the positive electrode active material 22b is not formed on the extension.

The extension of the negative electrode 21 and the extension of the positive electrode 22 are disposed so as to extend toward mutually opposite directions. The plurality of negative electrodes 21 are integrated in such a way that the extensions are electrically connected to each other by welding, and are connected to the negative electrode tab 13 shown in FIG. 1. The plurality of positive electrodes 22 are also integrated in such a way that the extensions are electrically connected to each other by welding, and are connected to the positive electrode tab 14 shown in FIG. 1.

Figure 4:
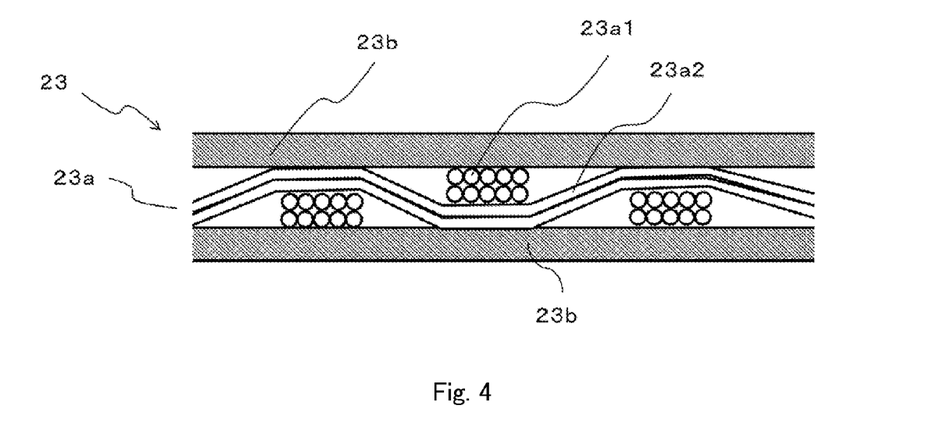
FIG. 4 is a schematic cross-sectional view of an example of the separator shown in FIG. 2.

FIG. 4 shows a schematic cross-sectional view of the separator 23 shown in FIG. 2. The separator 23 has, as the basic constitution thereof, the above-described substrate 23a, and an inorganic fiber layer 23b laminated on one surface or both surfaces of the substrate 23a. In the example shown in FIG. 4, the substrate 23a is constituted with a fabric woven with inorganic fibers and has the warp 23a1 and the weft 23a2. Also, in the example shown in FIG. 4, the inorganic fiber layer 23b is laminated on both surfaces of the substrate 23a, but may also be laminated only on one surface.

The electrode element 10 having such a planar laminate structure has no portion small in radius of curvature (the region close to the winding core of a wound structure), and has an advantage of being hardly affected by the volume variation of the electrodes caused by charging and discharging, as compared with electrode elements having wound structure. In other words, the electrode element 10 having such a planar laminate structure is effective as the electrode element using an active material tending to cause volume expansion.

<Negative Electrode>

The lithium secondary battery of present Embodiment is provided with a negative electrode having a negative electrode active material. The negative electrode active material can be bonded on the negative electrode current collector by a negative electrode binder.

The negative electrode active material in present Embodiment is not particularly limited; examples of the negative electrode active material include a carbon material (a) capable of occluding and releasing lithium ion, a metal (b) capable of alloying with lithium, and a metal oxide (c) capable of occluding and releasing lithium ion.

Examples of the carbon material (a) include: carbon, amorphous carbon, diamond-like carbon, carbon nanotube, and composite products of these. A high crystallinity carbon is high in electrical conductivity, and excellent in the adhesiveness to the negative electrode current collector made of a metal such as copper and the voltage flatness. On the other hand, a low crystallinity amorphous carbon is relatively smaller in volume expansion, accordingly high in the effect of alleviating the volume expansion of the whole negative electrode, and hardly undergoes degradations due to non-uniformities such as grain boundary and defects.

Examples of the metal (b) include: Al, Si, Pb, Sn, In, Bi, Ag, Ba, Ca, Hg, Pd, Pt, Te, Zn and La; or alloys of two or more of these. These metals or these alloys may also be used as mixtures of two or more thereof. These metals or these alloys may also contain one or more nonmetal elements. In present Embodiment, tin or silicon is preferably contained as a negative electrode active material, and silicon is more preferably contained. This is because tin or silicon can occlude at most 4.4 lithium atoms per one atom thereof to be large in capacity, and these elements themselves are actually successfully used in various fields and are easy to handle. Moreover, silicon is an element lighter than tin, and hence is higher in the capacity per unit weight.

Examples of the metal oxides (c) include: silicon oxide, aluminum oxide, tin oxide, indium oxide, zinc oxide, lithium oxide, or composite products of these. In present Embodiment, as the negative electrode active material, tin oxide or silicon oxide is preferably contained, and silicon oxide is more preferably contained. This is because silicon oxide is relatively stable and hardly causes reaction with other compounds. In the metal oxide (c), one or two or more elements selected from among nitrogen, boron and sulfur can be added, for example, in a content of 0.1 to 5% by mass. In this way, the electrical conductivity of the metal oxide (c) can be improved.

The metal oxide (c) preferably has amorphous structure in the whole thereof or in a fraction thereof. The metal oxides (c) having amorphous structure can suppress the volume expansion of the carbon material (a) or the metal (b), which is another negative electrode active material. The mechanism involved in the volume suppression is not clear; however, it is inferred that the metal oxide (c) is of an amorphous structure, and hence has a certain effect on the coat formation on the interface between the carbon material (a) and the electrolyte. Additionally, the amorphous structure is considered to be relatively fewer in the factors due to the nonuniformity such as grain boundary or defects. It is to be noted that the fact that the metal oxide (c) has amorphous structure in the whole thereof or in a fraction thereof can be verified by X-ray diffraction measurement (general XRD measurement). Specifically, when the metal oxide (c) has no amorphous structure, the peak inherent to the metal oxide (c) is observed; the case where the metal oxide (c) has amorphous structure in the whole thereof or in a fraction thereof is observed as the broadening of the peak inherent to the metal oxide (c).

The metal (b) is preferably silicon, and the metal oxide (c) is preferably silicon oxide. In other words, the negative electrode active material is preferably made of a composite substance (hereinafter, also referred to as "the Si/SiO/C composite substance) composed of silicon, silicon oxide and a carbon material. It is also possible to use, as the negative electrode active material, a material in which lithium is doped beforehand chemically or thermally. For example, the chemically doped material can be obtained by a method in which lithium is compulsorily doped into the active material by using a solvent that contains lithium metal or a lithium compound and by using a reducing agent. In the thermal doping, lithium can be doped into the negative electrode active material by the method in which the negative electrode active material and lithium metal are brought into contact with each other, and then wholly heated.

In the Si/SiO/C composite substance, for example, the whole or a fraction of silicon oxide is of an amorphous structure, and the whole or a fraction of silicon is dispersed in silicon oxide. Such a Si/SiO/C composite substance can be prepared, for example, by such a method as disclosed in Japanese Patent Laid-Open No. 2004-47404. Specifically, the Si/SiO/C composite substance can be obtained, for example, by performing a CVD treatment of silicon oxide in an atmosphere containing an organic substance gas such as methane gas. The Si/SiO/C composite substance obtained by such a method is in a form in which the surface of the particles made of silicon oxide containing silicon is covered with carbon. In silicon oxide, silicon is present as nanoclusters.

In the Si/SiO/C composite substance, the proportions of the carbon material, silicon and silicon oxide are not particularly limited. The proportion of the carbon material in the Si/SiO/C composite substance is set to be preferably 2% by mass or more and 50% by mass or less and more preferably 2% by mass or more and 30% by mass or less. The proportion of silicon in the Si/SiO/C composite substance is set to be preferably 5% by mass or more and 90% by mass or less and more preferably 20% by mass or more and 50% by mass or less. The proportion of silicon oxide in the Si/SiO/C composite substance is set to be preferably 5% by mass or more and 90% by mass or less and more preferably 40% by mass or more and 70% by mass or less.

The Si/SiO/C composite substance can be composed of a mixture of a carbon material, silicon and silicon oxide. For example, the Si/SiO/C composite substance can be obtained by mixing a particulate carbon material, particulate silicon and particulate silicon oxide. For example, a constitution can be adopted in which the average particle size of silicon is smaller than the average particle size of the carbon material and the average particle size of silicon oxide. In this way, silicon undergoing a large volume variation caused at the time of charging and discharging has a relatively smaller particle size, and the carbon material and silicon oxide each undergoing a small volume variation caused at the time of charging and discharging, each have a relatively larger particle size, and hence the production of dendrites and the formation of fine particles of alloys are more effectively suppressed. In the charging and discharging processes, lithium is occluded and released in the order of large particle size particles, small particle size particles and large particle size particles, and hence, from this viewpoint, the occurrence of the residual stress and the residual strain is suppressed. The average particle size of silicon can be made to be, for example, 20 μm or less, and is made to be preferably 15 μm or less.

As the negative electrode binder, for example, the following can be used, without being particularly limited to the following: polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid. Among these, polyimide and polyamideimide are preferable because of being strong in binding capability. The amount of the negative electrode binder used is preferably 5 to 25 parts by mass in relation to 100 parts by mass of the negative electrode active material from the viewpoint of "sufficient binding strength" and "achievement of high energy" being in a trade-off relation.

As the negative electrode current collector, aluminum, nickel, stainless steel, chromium, copper, silver, and alloys of these are preferable from the viewpoint of the electrochemical stability. Examples of the shape of the negative electrode current collector include foil, flat plate and mesh.

The negative electrode can be prepared by forming a negative electrode active material layer containing the negative electrode active material and the negative electrode binder on the negative electrode current collector. Examples of the method for forming the negative electrode active material layer include a doctor blade method, a die coater method, a CVD method and a sputtering method. The negative electrode may also be formed by forming a thin film of aluminum, nickel or an alloy of these on the negative electrode active material layer by a method such as vapor deposition or sputtering after the negative electrode active material layer is formed beforehand.

<Positive Electrode>

The positive electrode is, for example, formed by bonding the positive electrode active material to the positive electrode current collector with the positive electrode binder so as to cover the positive electrode current collector.

Examples of the positive electrode active material include: lithium manganates having layer structure and lithium manganates having spinel structure such as $LiMnO_2$, $Li_xMn_2O_4$ (0<x<2), $Li_2MnO_3$ and $Li_xMn_{1.5}Ni_{0.5}O_4$ (0<x<2); $LiCoO_2$, $LiNiO_2$ or the compounds obtained by replacing a fraction of these transition metals with other metals; lithium transition metal oxides in each of which the proportion of a specific transition metal does not exceed the half the total proportion of the transition metals, such as $LiNi_{1/3}Co_{1/3}Mn_{1/3}O_2$; the compounds obtained by making the proportions of Li excessive than the proportions of Li in the stoichiometric compositions in these lithium transition metal oxides; and the compounds having olivine structure such as $LiFePO_4$. The materials obtained by performing partial substitution in these metal oxides with, for example, Al, Fe, P, Ti, Si, Pb, Sn, In, Bi, Ag, Ba, Ca, Hg, Pd, Pt, Te, Zn and La can also be used. In particular, $Li_\alpha Ni_\beta Co_\gamma Al_\delta O_2$ ($1 \leq \alpha \leq 1.2$, $\beta+\gamma+\delta=1$, $\beta \geq 0.7$, $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is preferable. The positive electrode active materials can be used each alone or in combinations of two or more thereof.

Radical materials and the like can also be used as the positive electrode active material.

As the positive electrode binder, the same binders as the negative electrode binders can be used. Among these, polyvinylidene fluoride is preferable from the viewpoint of versatility and low cost. The amount of the positive electrode binder used is preferably 2 to 15 parts by mass in relation to 100 parts by mass of the positive electrode active material from the viewpoint of "sufficient binding strength" and "achievement of high energy" being in a trade-off relation.

As the positive electrode current collector, the same current collectors as the negative electrode current collectors can be used.

For the purpose of decreasing the impedance, an electroconductive aid may be added to the positive electrode active material layer containing the positive electrode active material. Examples of the electroconductive aid include: carbonaceous fine particles such as graphite, carbon black and acetylene black.

<Electrolyte>

As the electrolyte used in present Embodiment, a nonaqueous electrolyte containing a lithium salt (supporting electrolyte salt) and a nonaqueous solvent to dissolve the supporting electrolyte salt can be used.

As the nonaqueous solvent, the following aprotic organic solvents can be used: carbonic acid esters (linear or cyclic carbonates), carboxylic acid esters (linear or cyclic carboxylic acid esters) and phosphoric acid esters.

Examples of the carbonic acid ester solvent include: cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); and propylene carbonate derivatives.

Examples of the carboxylic acid ester solvent include: aliphatic carboxylic acid esters such as methyl formate, methyl acetate and ethyl propionate; and lactones such as γ-butyrolactone.

Among these, the following are preferable: carbonic acid esters (cyclic or linear carbonates) such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC) and dipropyl carbonate (DPC).

Examples of the phosphoric acid ester include: trimethyl phosphate, triethyl phosphate, tripropyl phosphate, trioctyl phosphate and triphenyl phosphate.

In addition to those listed above, examples of the solvents which can be contained in the nonaqueous electrolyte include: ethylene sulfite (ES), propane sulton (PS), butane sulton (BS), dioxathiolane-2,2-dioxide (DD), sulfolene, 3-methyl sulfolene, sulfolane (SL), succinic anhydride (SUCAH), propionic anhydride, acetic anhydride, maleic anhydride, diallyl carbonate (DAC), dimethyl 2,5-dioxahexanedioate, diethyl 2,5-dioxahexanedioate, furan, 2,5-dimethylfuran, diphenyl disulfide (DPS), dimethoxyethane (DME), dimethoxymethane (DMM), diethoxyethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyl tetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonate electrolyte, glyme, ether, acetonitrile, propionitrile, γ-butyrolactone, γ-valerolactone, dimethyl sulfoxide (DMSO)-ionic liquid, phosphazene, aliphatic carboxylic acid esters such as methyl formate, methyl acetate and ethyl propionate, or the compounds prepared by partially substituting hydrogen atoms of these compounds with fluorine atoms.

As the supporting electrolyte salt in present Embodiment, the lithium salts usable for common lithium-ion batteries such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$ and $LiN(CF_3SO_2)_2$ can be used. The supporting electrolyte salts can be used each alone, or in combinations of two or more thereof.

The nonaqueous solvents can be used each alone, or in combinations of two or more thereof.

The content of the fluorinated carbonate in the nonaqueous electrolyte is preferably 0.01% by mass or more and 50% by mass or less. When a fluorinated carbonate is contained in the electrolyte, the discharge capacity is increased, but when contained in a too large content, the viscosity in the electrolyte is increased and the resistance tends to be increased. Accordingly, the content of the fluorinated carbonate in the nonaqueous electrolyte is preferably 0.1% by mass or more, more preferably 1% by mass or more and furthermore preferably 2% by mass or more. Additionally, the content of the fluorinated carbonate in the nonaqueous electrolyte is preferably 30% by mass or less, more preferably 15% by mass or less and furthermore preferably 10% by mass or less.

Moreover, in order to enhance the flame retardant effect, for example, a fluorinated ether having Rv1-O-Rv2 (Rv1 and Rv2 are each alkyl group or fluoroalkyl group) structure, an ionic liquid or phosphazene may also be mixed in the nonaqueous electrolyte.

<Outer Package>

As the outer package, any outer package being stable against the electrolyte and having a sufficient water vapor barrier property can be appropriately selected. For example, in the case of a composite laminate type secondary battery, as the outer package, a laminate film composed of, for example, aluminum, silica-coated polypropylene and polyethylene can be used. In particular, it is preferable to use an aluminum laminate film from the viewpoint of suppressing the volume expansion. The outer package may be constituted with a single member, or alternatively, as shown in FIG. 1, may also be constituted by combining a plurality of members (outer package members 21 and 22).

Hereinafter, the present invention is described more specifically by way of Examples.

Example 1

Preparation of Battery (Method for Preparing Positive Electrode)

A mixture was prepared by mixing 85% by mass of a lithium manganese composite oxide ($LiMn_2O_4$) material as a positive electrode active material and 7% by mass of acetylene black as a conductive aid and 8% by mass of polyvinylidene fluoride as a binder; the resulting mixture was dispersed in N-methylpyrrolidone (NMP) to prepare a slurry; then, the slurry was applied to an aluminum foil (15 μm) as a positive electrode current collector and dried. After drying, the electrode was pressed and was prepared for the thickness after press treatment to be 80 μm. The area to which the active material was applied was set to be 100 mm in width and 200 mm in length.

(Method for Preparing Negative Electrode)

A mixture was prepared by mixing 90% by mass of a graphite material as a negative electrode active material and 10% by mass of polyvinylidene fluoride as a binder; the resulting mixture was dispersed in N-methylpyrrolidone (NMP) to prepare a slurry; then, the slurry was applied to a 10-μm copper foil as a negative electrode current collector and dried. After drying, the electrode was pressed and was prepared for the thickness after press treatment to be 65 μm. The area to which the active material was applied was set to be 102 mm in width and 202 mm in length.

(Preparation of Separator)

A plain woven glass cloth was prepared as a layer formed so as to have a plurality of openings, to be included in the substrate, wherein in the glass cloth, the thickness was 20 μm, the mesh opening was approximately 100 μm×100 μm, and the diameters of the glass fibers were 2 to 3 μm. As the material for the inorganic fiber layer disposed on the substrate, glass wool having a fiber diameter of 3 μm to 5 μm was prepared. The glass wool was cut so as to have a length of less than 1 mm.

A 1% aqueous solution of aluminum phosphate was prepared as a binder solution, in which the cut glass wool was dispersed.

The binder solution containing the glass wool as dispersed therein was impregnated into the glass cloth from one surface of the glass cloth. More specifically, the binder solution was impregnated from above the glass cloth placed on a mesh made of a fluororesin. The fraction of the binder solution that the glass cloth was not able to retain was discharged to below the glass cloth. Next, the glass cloth impregnated with the binder solution was dried at room temperature, and the dried glass cloth was withdrawn from the mesh and further heated to 300° C. in the atmosphere to solidify the binder. Thus, a separator was obtained in which a glass fiber layer was formed on the surface of the glass cloth from which the binder solution was supplied.

The thickness of the obtained separator was 30 μm. Accordingly, the thickness of the glass fiber layer was 10 μm. The porosity estimated from the density of the glass and the density of the separator was 68%. The obtained separator was cut to a width of 104 mm and a length of 204 mm, and thus the separator for the electrode element was completed. The completed separator was free from fraying fibers at the cut position, and was free from the deformation during handling.

(Preparation of Electrode Element)

The negative electrodes, positive electrodes and separators obtained as described above were laminated in the order of negative electrode/separator/positive electrode/separator/negative electrode/separator/positive electrode/separator/negative electrode, and thus an electrode element was prepared.

The ends, not covered with the positive electrode active material, of the positive electrode current collectors were superposed, a positive electrode tab made of aluminum was further superposed thereover, and these were supersonic welded together. Similarly for the negative electrodes, the ends, not covered with the negative electrode active material, of the negative electrode current collectors were superposed, a negative electrode tab made of copper was further superposed thereover, and these were supersonic welded together. As stated above, an electrode element having a planar laminate structure was obtained.

(Electrolyte)

A carbonate-based nonaqueous electrolyte composed of EC/PC/DMC/EMC/DEC=20/20/20/20/20 in terms of volume ratio was prepared, and $LiPF_6$ as the supporting electrolyte salt was further dissolved in a concentration of 1 mole/little to form an electrolyte.

(Assembly of Battery)

The electrode element was wrapped with an aluminum laminate film as an outer package, the electrolyte was injected into inside the outer package, then the outer package was sealed in a reduced pressure atmosphere of 0.1 atm, and thus a secondary battery was prepared.

For the 10 secondary batteries prepared as described above, the number of the batteries in which the positive electrode and the negative electrode underwent short-circuit was counted. The batteries which underwent short-circuit are considered to be the batteries in which the glass cloth was frayed during assembly to cause the short-circuit between the electrodes. Next, for each of the batteries free from the occurrence of short-circuit, the initial discharge capacity was measured. The conditions of the initial charge-discharge were such that the current was 0.05 C, the environmental temperature was 20° C., and the voltage upper and lower limits were 4.2 V and 2.5 V, respectively. In this case, the case where the electric potential was not able to be applied and the charge was not able to be performed, the case where the charge was possible, but the charging potential did not reach 4.2 V, and the case where the charge-discharge efficiency (=discharge capacity/charge capacity) was less than 60% were determined to undergo the occurrence of micro short-circuit.

Example 2

The binder solution for fixing the glass fibers used in Example 1 was altered to a 2% aqueous solution of polyvinyl alcohol (PVA). The aqueous solution of PVA in which glass wool was dispersed was impregnated from one surface of a glass cloth, and the glass cloth impregnated with the aqueous solution of PVA was dried at room temperature and then heat treated at 140° C. for 20 minutes in order to enhance the water resistance and the solvent resistance of PVA. The thickness of the thus prepared separator was 30 μm. Other conditions of preparation of the separator and the conditions of the preparation of the secondary battery were the same as in Example 1, and the prepared secondary battery was evaluated in the same manner as in Example 1.

Example 3

A 10-nm thick polyethylene film was superposed on the same glass cloth as used in Example 1, and heated at 180° C. for 20 minutes. This treatment allowed the glass cloth to be impregnated with the molten polyethylene. Next, on the surface of the glass cloth, cut glass wool was scattered in the same manner as in Example 1. The glass cloth on which cut glass wool was scattered was heated at 180° C. for 10 minutes, and consequently the polyethylene melted again allowed the glass wool to be fixed to the glass cloth. The glass cloth was cooled to room temperature, and then the glass wool not fixed to the glass cloth was removed. The thickness of the thus prepared separator was 28 μm. Accordingly, the thickness of the glass fiber layer was 8 μm. Otherwise under the same conditions as in Example 1, a secondary battery was prepared, and the prepared secondary battery was subjected to the same evaluations as in Example 1.

Comparative Example 1

The glass cloth as a simple substance was adopted as the separator. A secondary battery was prepared under the same conditions as in Example 1 except that the glass cloth was used for the separator, and the prepared secondary battery was subjected to the same evaluations as in Example 1.

Comparative Example 2

The solution prepared by dispersing the glass wool cut in the same manner as in Example 1 in a 15% aqueous solution of PVA was applied to a glass cloth, the glass cloth was dried at room temperature and then heat treated at 140° C. for 20 minutes, and the thus treated glass cloth was adopted as the separator. The mesh openings of the glass cloth were blocked with the PVA film. The thickness of the thus prepared separator was 30 µm. A secondary battery was prepared under the same conditions as in Example 1, except for the separator, and the prepared secondary battery was subjected to the same evaluations as in Example 1.

The results of Examples and Comparative Examples are shown in Table 1. In Comparative Example 1 using the glass cloth as a simple substance, the ionic conductivity was satisfactory, but almost all the batteries underwent the occurrence of short circuit. This is probably because the texture of the glass cloth was not fixed, and consequently the cloth was frayed. In Comparative Example 2, the resistance was high, and consequently the charging was impossible. This was caused by the unsuccessful ionic conduction due to the blocking of the mesh openings by the PVA film.

In each of Examples 1 to 3, the Li-ion conduction and the insulation between the electrodes were both satisfactory. The satisfactory ionic conduction indicates that the inorganic fiber layer was not embedded by the binder. The satisfactory insulation between the electrodes indicates that the fixation of the texture of the glass cloth and the fixation of the fibers of the inorganic fiber layer were performed by the binder or the thermoplastic resin.

TABLE 1

| | Thickness of inorganic fiber layer (µm) | Ionic conductivity (S/cm) | Number of batteries undergoing short-circuit after assembly | Number of batteries undergoing micro short-circuit in initial charge-discharge |
|---|---|---|---|---|
| Example 1 | 10 | $10^{-3} \leq$ | 0 | 0 |
| Example 2 | 10 | $10^{-3} \leq$ | 0 | 0 |
| Example 3 | 8 | $10^{-3} \leq$ | 0 | 1/10 |
| Comparative Example 1 | 0 | $10^{-3} \leq$ | 5/10 | 3/5 |
| Comparative Example 2 | 10 Mesh openings were blocked by PVA | $\leq 10^{-6}$ | 0 | Charge was impossible. |

INDUSTRIAL APPLICABILITY

The present invention can be utilized in all the industrial fields needing electric power sources, and in the industrial fields related to the transportation, storage and supply of electric energy. Specifically, the present invention can be utilized for, for example, the electric power sources of the mobile devices such as cellular phones and notebook personal computers; the electric power sources for the media of movement and transport such as electric trains, satellites and submarines including the electrically driven vehicles such as electric vehicles, hybrid electric vehicles, electric motorcycles and electric power-assisted bicycles; back-up electric power sources such as UPSs; electric power storage facilities for storing electric power generated by solar power generation, wind power generation and the like.

REFERENCE SIGNS LIST

1 Secondary battery
10 Electrode element
11 Outer package member
12 Outer package member
13 Negative electrode tab
14 Positive electrode tab
21 Negative electrode
21a Negative electrode current collector
21b Negative electrode active material
22 Positive electrode
22a Positive electrode current collector
22b Positive electrode active material
23 Separator
23a Substrate
23a1 Warp
23a2 Weft
23b Inorganic fiber layer

The invention claimed is:

1. A separator for an electrode element having a positive electrode and a negative electrode disposed so as to face each other, the separator comprising:
a substrate including at least a layer formed by using an inorganic material so as to have a plurality of openings; and
an inorganic fiber layer laminated on one surface or both surfaces of the substrate so as to cover the openings without blocking the openings, wherein the inorganic fiber layer is fixed to the substrate by a binder which is impregnated into the inorganic fiber layer,
wherein the thickness of an entirety of the separator is 100 µm or less.

2. The separator according to claim 1, wherein the layer formed of an inorganic material is a woven fabric or a knitted fabric made of inorganic fibers.

3. The separator according to claim 2, wherein the layer made of an inorganic material is a glass cloth.

4. The separator according to claim 1, wherein the inorganic fiber layer contains glass fibers.

5. The separator according to claim 1, wherein at least one of the substrate and the inorganic fiber layer is fixed with the binder.

6. An electrode element comprising:
the separator according to claim 1; and
a positive electrode and a negative electrode disposed so as to face each other with the separator interposed therebetween.

7. An electric energy storage device comprising:
the electrode element according to claim 6,
an electrolyte; and
an outer package including the electrode element and the electrolyte.

8. A method for producing a separator for an electrode element having a positive electrode and a negative electrode disposed so as to face each other, the production method comprising:
preparing a substrate including at least a layer formed by using an inorganic material so as to have a plurality of openings; and
laminating an inorganic fiber layer on one surface or both surfaces of the substrate by fixing the inorganic fiber layer to the substrate with a binder which is impregnated into the inorganic fiber layer,
wherein the thickness of the substrate and the thickness of the inorganic fiber layer are selected such that the thickness of an entirety of the separator is 100 µm or less.

9. The production method according to claim 8, wherein the step of laminating the inorganic fiber layer includes applying a binder in which inorganic fibers are dispersed on the substrate and solidifying the binder.

10. The separator according to claim 1, wherein the thickness of the inorganic fiber layer is 1 μm to 20 μm.

11. The separator according to claim 1, wherein inorganic fibers of the inorganic fiber layer are fixed to each other by a binder or a thermoplastic resin.

12. The production method according to claim 8, wherein the thickness of the inorganic fiber layer is 1 μm to 20 μm.

13. The production method according to claim 8, wherein the step of laminating the inorganic fiber layer includes
providing inorganic fibers on the substrate and
fixing the inorganic fibers to each other with the binder on the substrate.

14. The production method according to claim 13, wherein the step of providing the inorganic fibers includes impregnating a binder solution containing the inorganic fibers as dispersed therein into the substrate, and wherein the step of fixing the inorganic fibers to each other includes drying or heating the binder solution.

* * * * *